(12) United States Patent
Okuaki et al.

(10) Patent No.: US 9,381,437 B2
(45) Date of Patent: Jul. 5, 2016

(54) GAME MACHINE, CONTROL METHOD OF CONTROLLING COMPUTER AND COMPUTER PROGRAM USED THEREIN

(75) Inventors: Masato Okuaki, Zama (JP); Tomoaki Hirai, Zama (JP); Toshiaki Shimizu, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/385,746

(22) PCT Filed: Mar. 20, 2012

(86) PCT No.: PCT/US2012/029752
§ 371 (c)(1),
(2), (4) Date: Sep. 16, 2014

(87) PCT Pub. No.: WO2013/141843
PCT Pub. Date: Sep. 26, 2013

(65) Prior Publication Data
US 2015/0045099 A1    Feb. 12, 2015

(51) Int. Cl.
*G07F 17/32*    (2006.01)
*A63F 13/45*    (2014.01)
*A63F 13/213*   (2014.01)
*A63F 13/60*    (2014.01)

(52) U.S. Cl.
CPC ............ *A63F 13/45* (2014.09); *A63F 13/213* (2014.09); *A63F 13/60* (2014.09); *G07F 17/322* (2013.01); *G07F 17/3297* (2013.01)

(58) Field of Classification Search
CPC ...................................... G07F 17/32
See application file for complete search history.

(56) References Cited

U.S. PATENT DOCUMENTS

| 5,507,490 A | 4/1996 | Hagiwara |
| 5,860,648 A * | 1/1999 | Petermeier ............. A63B 67/02 273/108.2 |
| 5,951,009 A | 9/1999 | Miyamoto et al. |

FOREIGN PATENT DOCUMENTS

| JP | 07265492 A2 | 10/1995 |
| JP | 2007-37722 A | 2/2007 |
| JP | 2007-215738 A | 8/2007 |
| JP | 2011-19971 A | 2/2011 |
| JP | 2011-125460 A | 6/2011 |

OTHER PUBLICATIONS

International Preliminary Report on Patentability (PCT/US2012/029752); Date of Issuance of this Report: Sep. 23, 2014.
International Search Report and Written Opinion (PCT/US2012/029752)—Date of Mailing: Jun. 8, 2012.
Notice of Reasons for Rejection with English Translation (JP 2015-501635); Dispatched Jan. 26, 2016.

* cited by examiner

*Primary Examiner* — Omkar Deodhar
(74) *Attorney, Agent, or Firm* — Howard & Howard Attorneys PLLC

(57) ABSTRACT

A game machine gives a predetermined favor when at least one ball moves on a table and the ball arrives at a ditch. And, the game machine includes a camera that acquires object information for distinguishing a state of the ball on the table, distinguishes the state of the ball on the table, based on the object information acquired by the camera, evaluates the state of the ball on the table based on a result of the distinguishing, and gives a change to the state of the ball on the table based on an evaluation result so that the evaluation result changes.

18 Claims, 10 Drawing Sheets

Fig.5A

Numbers of balls

| Numbers of balls | 1 | 2 | 3 | 4 | 5 | 6 | 7 | 8 | 9 | 10 |
|---|---|---|---|---|---|---|---|---|---|---|
| Score | 2 | 4 | 6 | 8 | 10 | 12 | 14 | 16 | 18 | 20 |

Kinds of balls 14a, 14b, 14c, 25b

| Kinds of balls | | | |
|---|---|---|---|
| Score | 1 | 2 | 4 |

Fig.5C

25c Positions of balls
(Position information is divided by the Zone)

| Zone | A | B | C |
|---|---|---|---|
| Score | 1 | 2 | 3 |

| Score of number |
|---|
| Score of kind |
| Score of position |
| Total score |

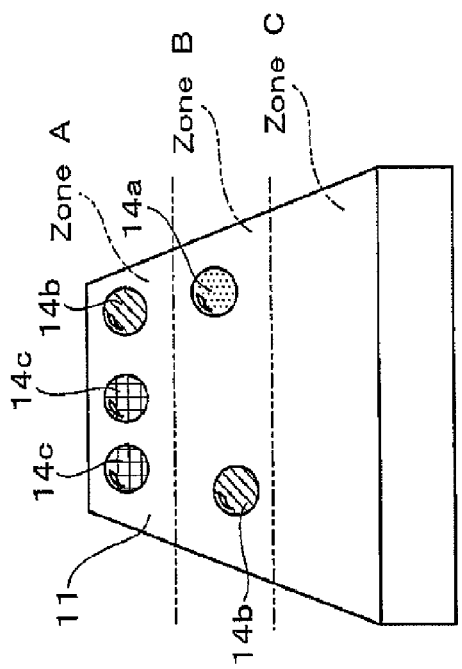

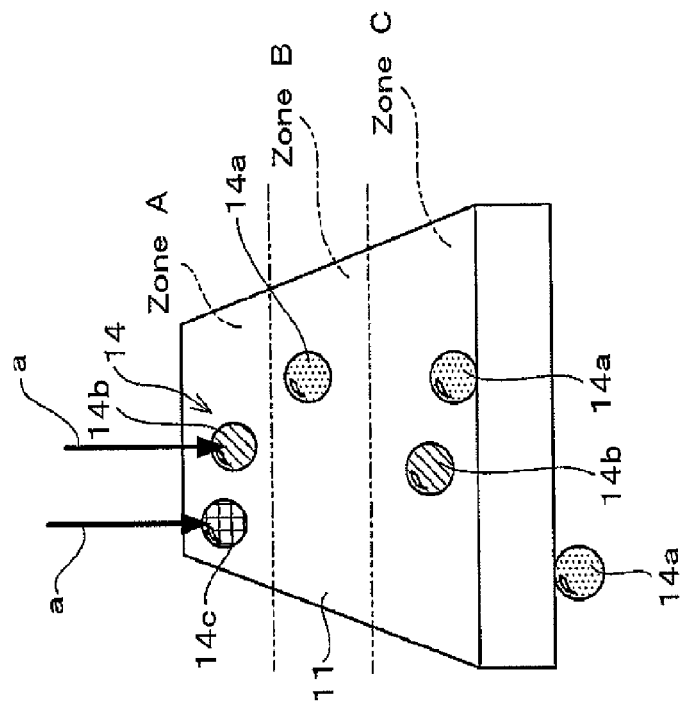

GAME MACHINE, CONTROL METHOD OF CONTROLLING COMPUTER AND COMPUTER PROGRAM USED THEREIN

CROSS REFERENCE TO RELATED APPLICATION

This application is a national stage application of PCT/US2012/029752, filed Mar. 20, 2012, the disclosure of which is hereby incorporated by reference in its entirety.

TECHNICAL FIELD

The present invention relates to a game machine etc. that gives a favor when at least one object moves in a predetermined area and the object arrives at a favor giving position.

BACKGROUND ART

There is a game machine that gives a predetermined favor when at least one object moves in a predetermined area, and the object arrives at a favor giving position. As such a game machine, a pusher game machine that provides a pusher game is known in which a pusher pushes an object such as a medal placed on a table (for example, see Patent literature 1). Patent literature 1: Japanese Patent Application Laid-Open No. 2007-037722.

SUMMARY OF INVENTION

Technical Problem

In the pusher game like in Patent literature 1, when the medal or the like falls to a ditch serving as the favor giving position arranged on an end side of the table, the medal or the like is given to a player as a favor. Moreover, as one of the pusher games, there is a game in which objects associated with predetermined favors such as a bonus favor and the like are arranged on the table besides the medal. In such a pusher game, when one of the objects falls to the ditch, a predetermined favor associated with the object is given. Therefore, an expectation value to obtain the predetermined favor increases as the number of the objects increases or as a distance of a position of the object to the ditch decreases. On the other hand, the objects arranged on the table are usually randomly determined by lot. Therefore, the expectation value to obtain the predetermined favor varies depending on the state of the objects on the table for each time or each machine.

Therefore, an object of the present invention is to provide a game machine that can adjust the state of the object in the predetermined area, a control method of controlling a computer and a computer program used therein.

Solution to Problem

In order to solve the above problems, a game machine according to the present invention gives a predetermined favor when at least one object moves in a predetermined area and the object arrives at a favor giving position, and comprises: an object information acquiring device that acquires object information for distinguishing a state of the object in the predetermined area; a state distinguishing device that distinguishes the state of the object in the predetermined area, based on the object information acquired by the object information acquiring device; a state evaluating device that evaluates the state of the object in the predetermined area based on a result of the distinguishing of the state distinguishing device; and a change giving device that gives a change to the state of the object in the predetermined area based on an evaluation result of the state evaluating device so that the evaluation result changes.

According to the present invention, the state of the object in the predetermined area is evaluated. Moreover, the evaluation result is used to change the state of the object. That is, the state of the object can be changed by using the evaluation result concerning the state of the object. As a result, adjustment can be executed such that the state of the object is improved when the evaluation result is not good, and the state of the object is maintained when the evaluation result is good. That is, the state of the object in the predetermined area can be adjusted by changing the state of the object. Moreover, since the predetermined favor is given when the object arrives at the favor giving position, the state of the object is in relation with the expectation value for the predetermined favor. Therefore, the expectation value for the predetermined favor can be adjusted by adjusting the state of the object in the predetermined area.

Also, in order to solve the above problems, a control method of controlling a computer according to the present invention is a control method of controlling a computer which is incorporated in a game machine giving a predetermined favor when at least one object moves in a predetermined area and the object arrives at a favor giving position, and the game machine including an object information acquiring device that acquires object information for distinguishing a state of the object in the predetermined area, wherein the control method of controlling the computer comprises the steps: a state distinguishing step that distinguishes the state of the object in the predetermined area, based on the object information acquired by the object information acquiring device; a state evaluating step that evaluates the state of the object in the predetermined area based on a distinguishing result of the state distinguishing step; and a change giving step that gives a change to the state of the object in the predetermined area based on an evaluation result of the state evaluating step so that the evaluation result is changed.

And, in order to the above problems, a computer program for a game machine according to the present invention is a computer program for a game machine giving a predetermined favor when at least one object moves in a predetermined area and the object arrives at a favor giving position, the game machine including an object information acquiring device that acquires object information for distinguishing a state of the object in the predetermined area, wherein the computer program is configured to make a computer incorporated in the game machine serve as; a state distinguishing device that distinguishes the state of the object in the predetermined area, based on the object information acquired by the object information acquiring device; a state evaluating device that evaluates the state of the object in the predetermined area based on a result of the distinguishing of the state distinguishing device; and a change giving device that gives a change to the state of the object in the predetermined area based on an evaluation result of the state evaluating device so that the evaluation result changes. According to the control method of controlling the computer or the computer program of the present invention, it is possible to realize the game machine of the present invention.

BRIEF DESCRIPTION OF DRAWINGS

FIG. 5A is a diagram illustrating an example of contents of number evaluation data.

FIG. 5B is a diagram illustrating an example of contents of kind evaluation data.

FIG. 5C is a diagram illustrating an example of contents of position evaluation data.

FIG. 5D is a diagram illustrating an example of contents of evaluation reference data.

FIG. 7A is a diagram illustrating a table state of a first evaluation target.

FIG. 7B is a diagram illustrating an example of contents of evaluation comparison data corresponding to the evaluation result of FIG. 7A.

FIG. 9A is an explanatory diagram for describing an example of the number or the like of balls that will be added next time in the case of the table state of FIG. 8A.

FIG. 9B is a diagram illustrating an example of contents of evaluation comparison data corresponding to the evaluation result of the state of FIG. 9A.

DESCRIPTION OF EMBODIMENTS

Figure 1:
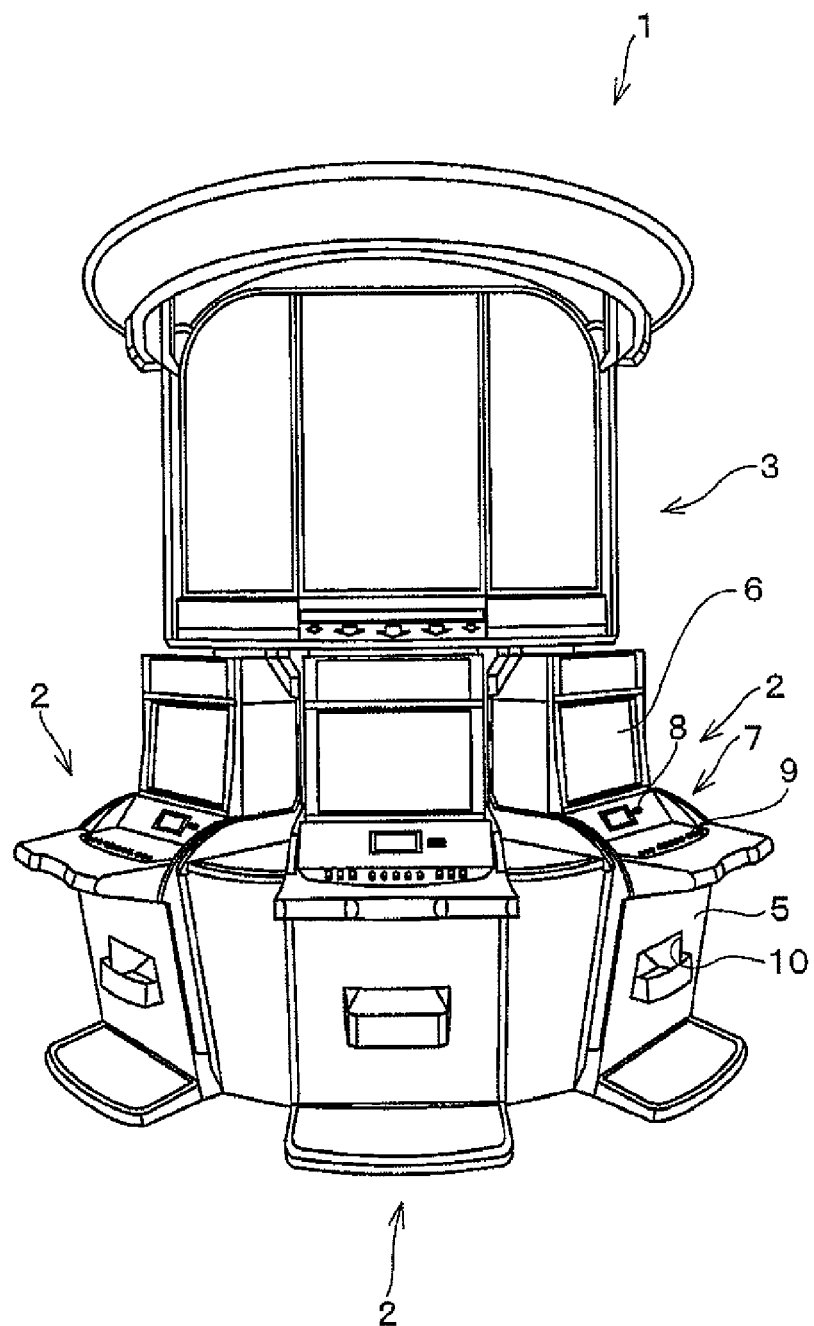
FIG. 1 is an outline view of a game machine according to an embodiment of the invention.

Hereafter, a game machine according to an embodiment of the present invention is described with reference to the drawings. FIG. 1 is an outline view of a game machine according to an embodiment of the present invention. As illustrated in FIG. 1, a game machine 1 includes station units 2 and a center unit 3. Moreover, the respective station units 2 are arranged around the center unit 3. The number of the station units 2 is an appropriate number. For example, the number of the station units 2 may be even one.

The station unit 2, for example, offers a slot game in exchange for the consumption of coins serving as a game value. The slot game means a well-known game in which a predetermined favor is given when displays of symbols change as a result of lot and a combination of the displays of the symbols after the change forms a predetermined winning arrangement. A known slot game machine may be used as the station unit 2. For example, the station unit 2 includes a casing 5. A station monitor 6 is provided on the front surface of the casing 5. For example, a liquid crystal display device is used as the station monitor 6. A control panel 7 is provided under the station monitor 6. A coin slot 8 and an operation device 9 are provided in the control panel 7. The operation device 9 includes an operation member such as a button switch configured to perform various operations including a bed operation or the like. Moreover, a coin payment port 10 is provided under the control panel 7.

On the other hand, when a predetermined game condition is met in the station unit 2, the center unit 3 provides a pusher game. The pusher game means a known game in which a pusher moves a physical medium such as a medal arranged on a table up to a ditch on the edge of the table, and a favor is given in accordance with the contents (number, kind, or the like) of the physical medium that falls to the ditch. Moreover, as the predetermined game condition, for example, there is adopted a condition that is met when specific symbols form a winning arrangement in the slot game. In addition, the predetermined game condition is not limited to such an embodiment. As the predetermined game condition, for example, various conditions relating to a slot game may be used: a condition which is met when a predetermined number or more of winning arrangements are formed; a condition which is met when a specific winning arrangement is formed; and the like. Or, when a game other than the slot game is executed in the station unit 2, various kinds of conditions relating to the game may be adopted as the predetermined game condition.

Figure 2:
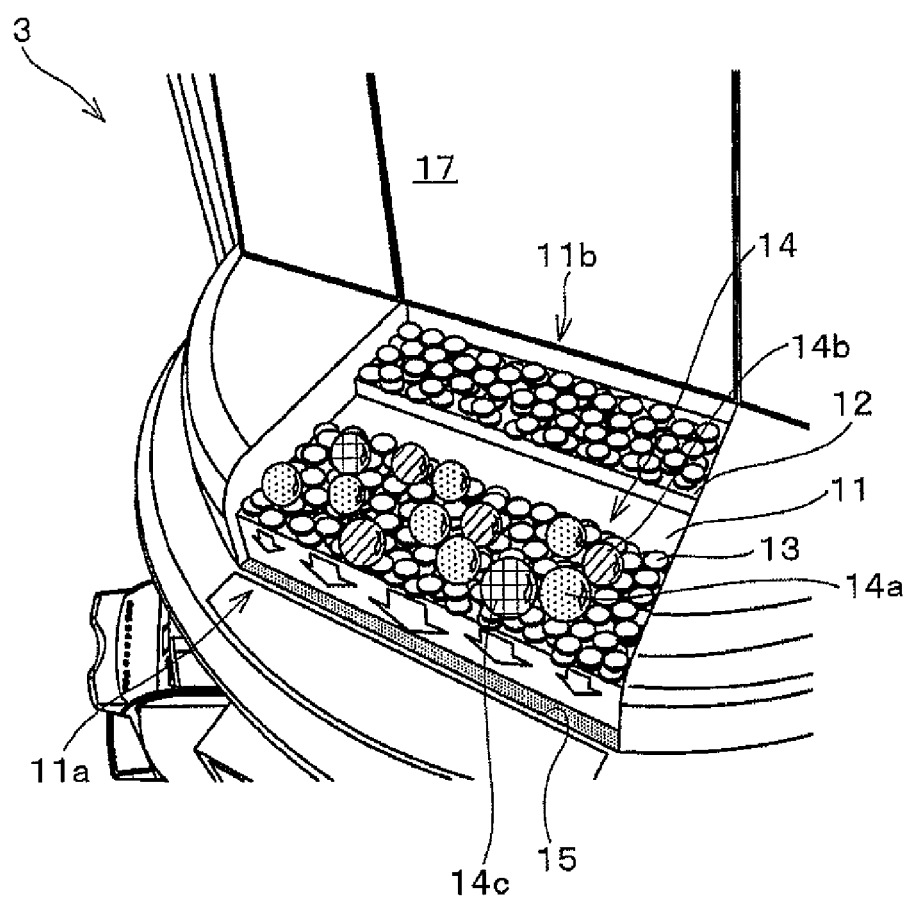
FIG. 2 is a diagram schematically illustrating an enlarged perspective view of a center unit when viewed from the top.

Referring to FIG. 2, the pusher game will be described in detail. FIG. 2 is a diagram schematically illustrating an enlarged perspective view of the center unit 3 when viewed from the top. As illustrated in FIG. 2, in order to provide the pusher game, the center unit 3 includes a table 11 serving as a predetermined area, and a pusher 12. Moreover, medals 13 as physical media and balls 14 as objects are arranged on the table 11. Moreover, a ditch 15 serving as a favor giving position is provided on one edge side 11a of the table 11. The pusher 12 repeatedly executes such an operation that the pusher moves toward one end side 11a of the table 11 along the surface of the table 11 and moves back to its original position. And, the medals 13 and the balls 14 are added to the other end side 11b of the table 11 at proper timing. Moreover, these are added to a moving range of the pusher 12. The medals 13 and the like located in the moving range of the pusher 12 are pushed by the pusher 12 toward the one end side 11a along with the movement of the pusher 12 to the one end side 11a. Further, the respective medals 13 on the table 11 are pushed in a chain due to the pushed medals 13 and the like, and thus some of them fall to the ditch 15. And, when the balls 14 fall to the ditch 15, a predetermined favor is given to the player according to the kinds of the balls 14 that have fallen.

In an example of FIG. 2, three kinds of balls 14 are illustrated as the balls 14. Specifically, a first ball 14a, a second ball 14b, and a third ball 14c are illustrated as the balls 14. These balls 14 are distinguished from each other, for example, by a difference in color. In FIG. 2, in order to express the difference in color, a dot pattern, a slash pattern, and a grid pattern are used for the first ball 14a, the second ball 14b, and the third bowl 14c, respectively. Moreover, as the predetermined favor, respectively different favors are set to the three kinds of balls 14a, 14b, and 14c. For example, when coins are given as the predetermined favor, different favors (values) are set such that the respective amounts of payment increases in order of the first ball 14a, the second ball 14b, and the third ball 14c.

Moreover, a camera 16 (see FIG. 3) as an object information acquiring device and a center monitor 17 are provided in the center unit 3. The camera 16 is arranged above the table 11 so as to capture an image of the movement of the balls 14 on the table 11. An image capturing range of the camera 16 will be described below. The center monitor 17 is provided such that an image captured by the camera 16 can be displayed. For example, on the center monitor 17, there is displayed the image captured when the balls 14 fall to the ditch 15 by using the image capturing result of the camera 16 so that a surrounding player is easy to confirm the image. Or, the image captured at the time of falling may be displayed in an enlarged manner, or in a repetitive manner.

Figure 3:
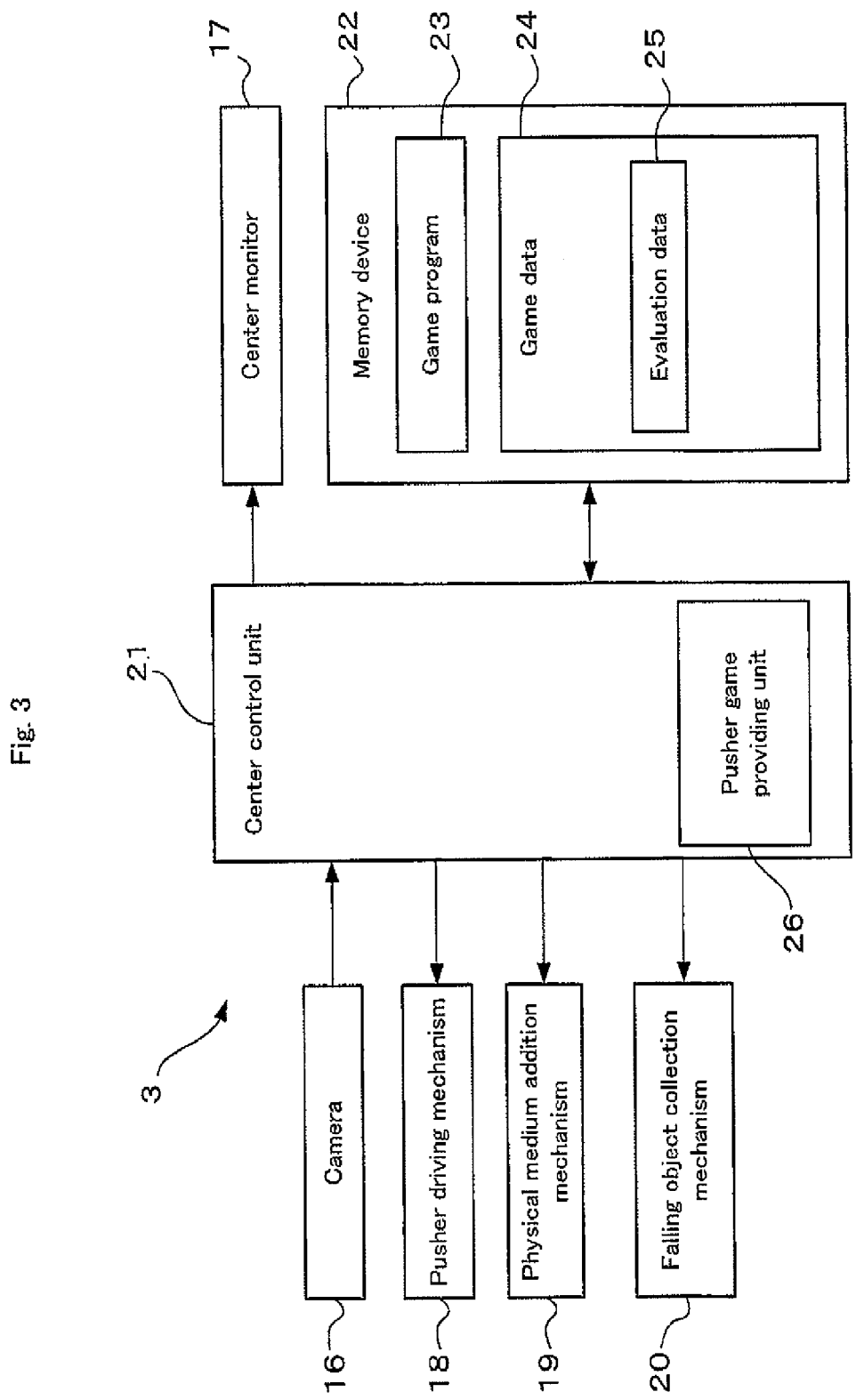
FIG. 3 is a functional block diagram illustrating a schematic configuration of a control system of the center unit.

Next, the structure of a control system of the center unit 3 will be described with reference to FIG. 3. FIG. 3 is a functional block diagram illustrating a schematic configuration of the control system of the center unit 3. A center control unit 21 is provided in the center unit 3 as illustrated in FIG. 3. The center control unit 21 is configured as a computer unit that controls the center unit 3. Specifically, the center control unit 21 is configured as a computer unit which includes a microprocessor, a main memory device necessarily used for the operation of the microprocessor, and other peripheral devices.

The camera 16 and the center monitor 17 described above are connected with the center control unit 21. An image capturing time and the like of the camera 16 are controlled by the center control unit 21. Moreover, the image capturing result serving as object information is used for various processing performed by the center control unit 21. Further, the center monitor 17 is controlled by the center control unit 21, for example, so as to display the image captured by the camera 16 as described above.

Moreover, a pusher driving mechanism 18, a physical medium addition mechanism 19, and a falling object collection mechanism 20 are connected with the center control unit 21. The pusher driving mechanism 18 is a mechanism to repetitively move the pusher 12. The operation of the pusher driving mechanism 18 is controlled by the center control unit 21. That is, the operation of the pusher 12 is controlled by the center control unit 21 via the pusher driving mechanism 18.

The physical medium addition mechanism 19 is a mechanism to add the medals 13 and the like to the moving range of the pusher 12. Moreover, this mechanism 19 is configured to be able to distinguish between the kinds of physical media, that is, to distinguish between the medal 13, the first ball 14a, the second ball 14b, and the third ball 14c. The operation of the physical medium addition mechanism 19 is controlled by the center control unit 21. That is, the physical medium addition mechanism 19 controls addition timing at which the center control unit 21 adds the medals 13 and the like, and controls the kinds of the physical media to be added. More specifically, the physical medium addition mechanism 19 is configured to be able to add the first ball 14a when the first ball 14a should be added, add the second ball 14b when the second ball 14b should be added, and add the third ball 14c when the third ball 14c should be added, according to the control of the center control unit 21. For example, distinguishing between three kinds of balls 14 is achieved by using balls with different sizes or different colors for each kind.

The falling object collection mechanism 20 is a mechanism to collect the medals 13 and the balls 14 that have fallen to the ditch 15, and to supply them back to the physical medium addition mechanism 19 again. The operation of the falling object collection mechanism 20 is controlled by the center control unit 21. Moreover, a description about these mechanisms 18, 19, and 20 is omitted since they are known mechanisms.

Further, a memory device 22 is connected with the center control unit 21. As the memory device 22, for example, a storage medium, which can retain the memory even without power supply, is used. That is, a magnetic storage medium such as an HDD, an optical storage medium such as a DVD-ROM, or a nonvolatile semiconductor memory such as an EEPROM and the like may be used.

In the memory device 22, a game program 23 and game data 24 are stored. The game program 23 is a necessary program to cause the center unit 3 to execute the pusher game. The game data 24 is various kinds of data used when the game program 23 is executed. The game data 24 includes evaluation data 25 as an example of the various kinds of data. Details of the data 25 will be described later. The game program 23 is appropriately read and executed by the center control unit 21. The game data 24 is appropriately read and referred to by the center control unit 21.

The game program 23 is executed, and whereby a pusher game providing unit 26 is provided in the center control unit 21. The pusher game providing unit 26 executes various kinds of processes required for the center unit 3 to provide the pusher game. For example, the pusher game providing unit 26 executes a process to determine the number of medals 13, the number of balls 14, or the like to be added to the table 11. For example, the number of medals 13, balls 14, and the like that should be added are determined, for example, by lot. For example, as the lot, the pusher game providing unit 26 executes the lot by using random numbers. That is, in that case, the pusher game providing unit 26 executes a process to generate a random number and to determine the number or the like of the medals 13 to be added based on the generated random number. On the other hand, the pusher game providing unit 26 executes a process to evaluate the state of the table 11 in order to determine the number of balls 14 to be added. Details of these processes will be described below. Further, the pusher game providing unit 26 executes the following processes based on the results of these processes: a process to control the physical medium addition mechanism 19, a process to control the pusher driving mechanism 18, and a process to control the falling object collection mechanism 20. In addition, the medals 13 and the like to be added may be determined by lot using a well-known physical lot mechanism besides the example described above.

Next, the pusher game is further described. The pusher game progresses such that the pusher 12 pushes the medals 13 and the balls 14 added to the table 11 toward the ditch 15 as described above. That is, the game progresses along with addition of the medals 13 and the like to the table 11. The numbers, the positions, and the like of the medals 13 to be added are determined by lot using random numbers, for example, as described above. On the other hand, the numbers, the kinds, and the like of the balls 14 to be added are determined according to the state of the table 11.

Figure 4:
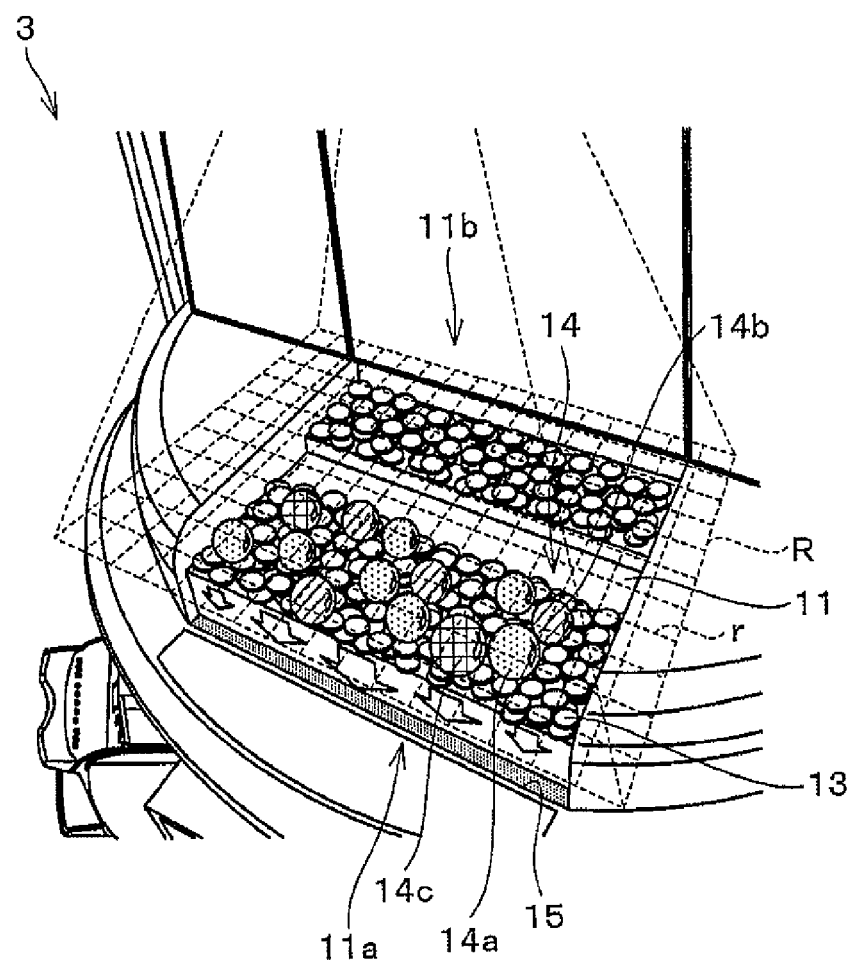
FIG. 4 is an explanatory diagram for describing a state of a table.

At first, the image capturing range of the camera 16 and the state of the table 11 will be described with reference to FIG. 4. FIG. 4 is an explanatory diagram for describing the state of the table 11. Moreover, a dotted line of FIG. 4 illustrates an image capturing range R of the camera 16. As illustrated in FIG. 4, the table 11 and the ditch 15 are within the image capturing range R of the camera 16. Moreover, the image capturing range R is divided into a predetermined number of unit ranges r and thus defined. For example, the size of each unit range r corresponds to the size of the ball 14. The position of each ball 14 on the table 11 is evaluated based on the unit range r where the ball 14 is located. Each of the balls 14 is more highly likely to fall as it becomes nearer the ditch 15. In other words, a probability that the favor set to the ball 14 can be given, that is, an expectation value that the predetermined favor will be given is high. Therefore, as a distance from the position of the ball 14 to the ditch 15 decreases, the evaluation on the state of the table 11 increases.

On the other hand, the movement of balls 14 is caused in chain, starting from the other end side 11b by an operation in which the pusher 12 pushes the medal 13 or the like. Therefore, the ball 14 nearest the ditch 15 does not necessarily fall to ditch 15 earliest. Therefore, even though the balls 14 near the ditch 15 are present, if the number of the balls 14 is small, these balls 14 do not necessarily fall by the progress of the next game (by the addition of medals 13 or the like). Therefore, the number of balls 14 that exist on the table 11 is evaluated. In a word, the larger the number of the balls 14 on the table 11 is, the higher the evaluation value is.

Further, different favors are obtained according to the kinds of the balls 14. Therefore, the evaluation on the state of the table 11 is different depending on the kinds of the balls 14 that exist on the table 11. Specifically, when the balls 14 that exist at the same position are compared, the evaluation on the table 11 is higher when the ball 14 is the third 14*c* than when the ball 14 is the first ball 14*a*. Thus, the state of the table 11 is evaluated, for example, by the positions, the numbers, and the kinds of the balls 14, and the number of balls 14 or the like to be added is determined according to this evaluation result. The evaluation on the state of the table 11 will be described further later.

Next, details of the evaluation data 25 will be described with reference to FIGS. 5A to 5D. The evaluation data 25 is used to evaluate the state of the table 11. The evaluation data 25 includes various kinds of data used to evaluate the state of the table 11. For example, the evaluation data 25 includes number evaluation data 25*a*, kind evaluation data 25*b*, and position evaluation data 25*c*, and evaluation reference data 25*d*.

The number evaluation data 25*a* is data to define a score for the number of the balls 14. FIG. 5A is a diagram illustrating an example of the contents of the number evaluation data 25*a*. As illustrated in FIG. 5A, information representing the numbers of balls and information representing the scores for the respective numbers are described in the number evaluation data 25*a* so as to be in association with each other. Specifically, in the example of FIG. 5A, the score "2" is associated with the number "1" of the balls 14. Therefore, in this example, the score "2" is given as an evaluation result concerning the number when there is only one ball 14 on the table 11.

The kind evaluation data 25*b* is data to define the score for the kind of the ball 14. FIG. 5B is a diagram illustrating an example of the contents of the kind evaluation data 25*b*. As illustrated in FIG. 5B, information representing the kinds of the balls 14 and information representing the scores for each kind are described in association with each other in the kind evaluation data 25*b*. Specifically, in the example of FIG. 5B, a figure of a ball having a dotted pattern is used as information representing the first ball 14*a*, a figure of a ball having a dash pattern is used as information representing the second ball 14*b*, and a figure of a ball having a grid pattern is used as information representing the third ball 14*c*. As an example, the score "1" is associated with the information representing the first ball 14*a*. Therefore, in this example, when the ball 14 being present on the table 11 is the first ball 14*a*, the score "1" is given as the evaluation result concerning the kind. In addition, as the information representing the kinds of the balls 14, numerical characteristics such as "1", "2", and "3" that are associated with various kinds such as the first ball 14*a* and the like are used, for example.

The position evaluation data 25*c* is data to define the scores for the positions of the balls 14. FIG. 5C is a diagram illustrating an example of the contents of the position evaluation data 25*c*. The position of the ball 14 is evaluated by using Zones that make up the table 11 for example. Specifically, the Zone where the ball 14 is located will be evaluated. The example of FIG. 5C indicates the case in which the positions of the balls 14 are evaluated using three zones Zone A, Zone B, and Zone C. As illustrated in FIG. 5C, information representing each Zone And information representing a score for each Zone Are described in association each other in the position evaluation data 25*c*. Moreover, alphabets such as "A" are used as the information representing each Zone of the table 11 in the example of FIG. 5C. For example, these alphabets are associated such that "A" is associated with the Zone A, "B" to the Zone B, and "C" to the Zone C. And, the score "1" is associated with the Zone "A" in the example of FIG. 5C, for example. Therefore, in that example, when the ball 14 is located in the Zone A, the score "1" is given as an evaluation result concerning the position. Each Zone that makes up the table 11 will be mentioned in the description about the evaluation of the state of the table 11 to be described later.

The evaluation reference data 25*d* is data to define a score corresponding to a reference state of the table 11. FIG. 5D is a diagram illustrating an example of the contents of the evaluation reference data 25*d*. As illustrated in FIG. 5D, the evaluation reference data 25*d* includes information of scores for the number, the kind, and the position, respectively in the reference state of the table 11, and includes information of a total score obtained by adding up all of those scores. These pieces of information are used as an evaluation reference. Moreover, the information of each score included in the evaluation reference data 25*d* is obtained by evaluating the state of the table 11 defined in advance as the reference state based on the state evaluation data 25. The reference state of the table 11 will be mentioned in the description about the evaluation of the state of the table 11 to be described later.

Next, the state of the table 11 will be described in detail. The state of the table 11 is evaluated by comparison with the reference state defined in advance. FIG. 6A is an explanatory diagram for describing an example of the reference state of the table 11. The reference state of the table 11 is defined in advance. As illustrated in FIG. 6A, the table 11 is divided into the Zone A, the Zone B, and the Zone C that correspond to the three Zones of the example of FIG. 5C respectively in order to evaluate the positions of the balls 14. More specifically, the table 11 is segmented into three Zones including the Zone A, the Zone B, and the Zone C arranged in this order from the other end side 11*b* to the one end side 11*a* so that the table 11 is divided into three equal sections.

The first ball 14*a* and the second ball 14*b* are arranged in the Zone A, and moreover, the third ball 14*c* is arranged in the Zone B, and the second ball 14*b* and the first ball 14*a* are arranged in the Zone C in the example of FIG. 6A. In this case, based on the number evaluation data 25*a* of FIG. 5A, the score "10" corresponding to five balls 14 is given as an evaluation on the number. The five balls 14 include two first balls 14*a*, two second balls 14*b*, and one third ball 14*c*. Therefore, as an evaluation on the kinds of balls 14, based on the kind evaluation data 25*b* of FIG. 5B, there is given score "10" which is the total of the score "2" (the score "1"×two) corresponding to the two first balls 14*a*, the score "4" (the score "2"×two) corresponding to the two second balls 14*b*, and the score "4" corresponding to one third ball 14*c*. Further, as the evaluation of the position of balls 14, based on FIG. 5C, there is given the score "10" which is the total of the score "2" (the score "1"×two) corresponding to the two balls 14 in the Zone A, the score "2" corresponding to one ball 14 in the Zone B, and the score "6" (the score "3"×two) corresponding to the two balls 14 in the Zone C.

Figure 6B:
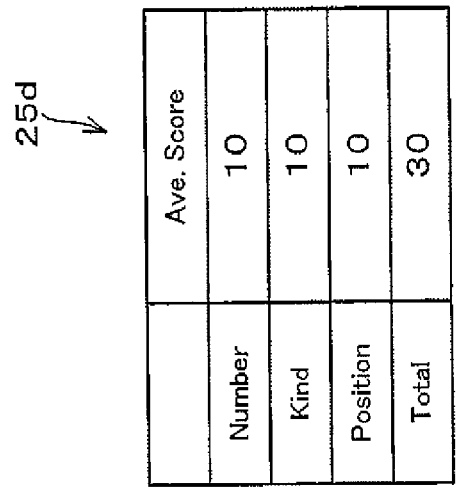
FIG. 6B is a diagram illustrating an example of contents of evaluation reference data corresponding to the state of FIG. 6A.
Figure 6A:
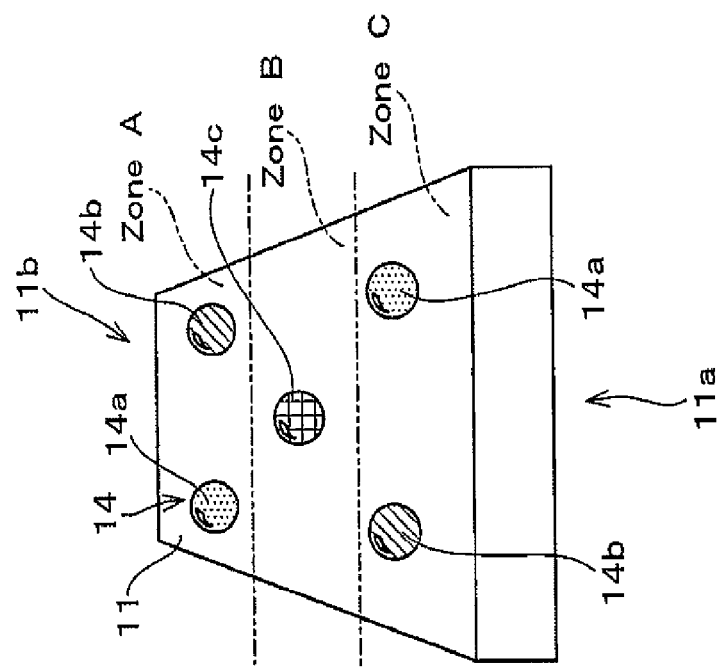
FIG. 6A is an explanatory diagram for describing an example of a reference state of a table.

FIG. 6B is a diagram illustrating an example of the contents of the evaluation reference data 25*d* corresponding to the state of FIG. 6A. As illustrated in FIG. 6B, scores for the number, the kind, and the position, respectively, and the total score as the reference total numerical value are described as information "Ave. Score" in the evaluation reference data 25*d*. The information "Ave. Score" corresponds to information on respective scores for the number, the kind, the position, and the total score thereof in the reference state of the table 11.

Therefore, in the example of FIG. 6B, "10" corresponding to the evaluation result of FIG. 6A is described as each of scores for the number, the kind, and the position. Moreover, the score "30" that is the total of these scores for the number, the kind, and the position is described as Total. "10" corresponding to each of the scores for the number, the kind, and the position, or "30" corresponding to the total score is used as the comparison reference when the state of the table 11 serving as the evaluation target is evaluated. The information "Ave. Score" functions as reference information of the present invention. Moreover, in the example of FIG. 6B, each of the scores "10" or "30" obtained using the information "Ave. Score" functions as a reference numerical value of the present invention.

The state of the table 11 serving as the evaluation target is evaluated on the basis of the reference state of the table 11. Specifically, the state of the table 11 as the evaluation target is first evaluated based on the number evaluation data 25a, the kind evaluation data 25b, and the position evaluation data 25c. In other words, the state of the table 11 as the evaluation target, that is, the number, the kind, and the position of the balls 14 on the table 11 as the evaluation target are expressed by scores (numerically expressed). Next, the respective scores for the number, the kind, and the position, and the total score as the total numerical value are compared with the respective scores described in the evaluation reference data 25d. As a result, the state of the table 11 as the evaluation target is evaluated on the basis of the reference state of the table 11. And, the comparative result, that is, the evaluation result is reflected when the balls 14 are added to the table 11 (when the game progresses).

An example of the evaluation on the state of the table 11 will be described with reference to FIGS. 7A and 7B. FIG. 7A is a diagram illustrating a table state of a first evaluation target. As illustrated in FIG. 7A, on the table 11 as the first evaluation target, two third balls 14c and one second ball 14b are arranged in the Zone A, and one first ball 14a and one second ball 14b are arranged in the Zone B. On the other hand, no balls 14 are arranged in the Zone C. Therefore, "10", "13", "7", and "30" are given as the score for the number, the score for the kind, the score for the position, and the total score, respectively.

The result obtained by expressing the table 11 serving as the first evaluation target by scores is stored temporarily in the memory device 22, for example, as the evaluation comparison data. And, the evaluation comparison data is used for the comparison with the evaluation reference data 25d. FIG. 7B is a diagram illustrating an example of the contents of the evaluation comparison data corresponding to the scoring result of FIG. 7A. Information "Ave. Score" of FIG. 7B corresponds to the information "Ave. Score" included in the evaluation reference data 25d. In other words, the information "Ave. Score" shows the respective scores for the number, the kind, and position, and the total score thereof described in the evaluation reference data 25d. On the other hand, "Current Score" shows the respective scores for the number, the kind, and the position, and the total score thereof concerning the table 11 serving as the evaluation target. That is, the evaluation comparison data 25e includes scores for the number, kind, and position, and the total score thereof concerning each of the table 11 serving as the first evaluation target and the table 11 serving as the reference state.

In the example of FIG. 7B, when each score concerning the table 11 as the first evaluation target is compared with each score in the evaluation reference data 25d, the total score of the table 11 as the first evaluation target is larger. In other words, the table 11 as the first evaluation target has a score equal to or higher than the reference. In this case, the state of the table 11 as the first evaluation target is evaluated as a state with a higher expectation value than the reference. When the expectation value is high like this, the state of table 11 needs not be adjusted. In this case, the number or the like of the balls 14 that will be added to the table 11 next time is determined by lot in a similar manner to the addition of the medals 13. That is, the balls 14 to be added are determined at random.

On the other hand, an example of an evaluation on the state of the table 11 with a low expectation value will be explained with reference to FIGS. 8A and 8B. FIG. 8A is a diagram illustrating a table state of a second evaluation target. As illustrated in FIG. 8A, on the table 11 as the second evaluation target, one first ball 14a is arranged in the Zone A, and two first balls 14a and one second ball 14b are arranged in the Zone C. On the other hand, no balls 14 are arranged in the Zone B. Accordingly, "8", "5", "10", and "21" are given as the score for the number, the score for the kind, the score for the position, and the total score thereof, respectively.

Figure 8B:
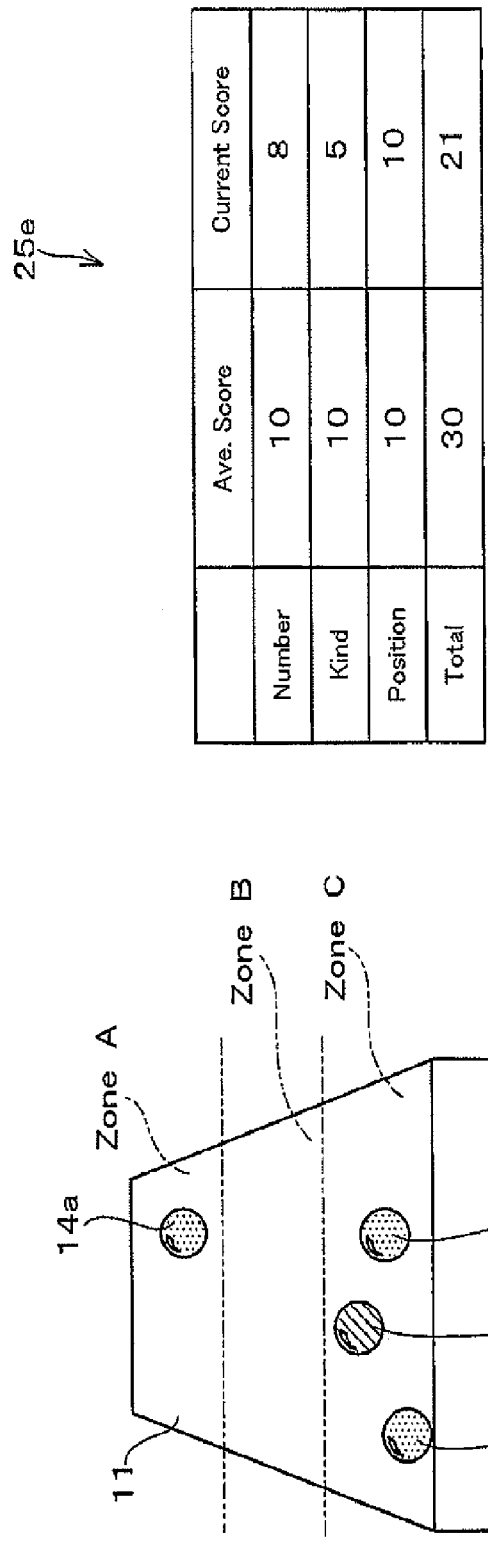
FIG. 8B is a diagram illustrating an example of contents of evaluation comparison data corresponding to the evaluation result of FIG. 8A.
Figure 8A:
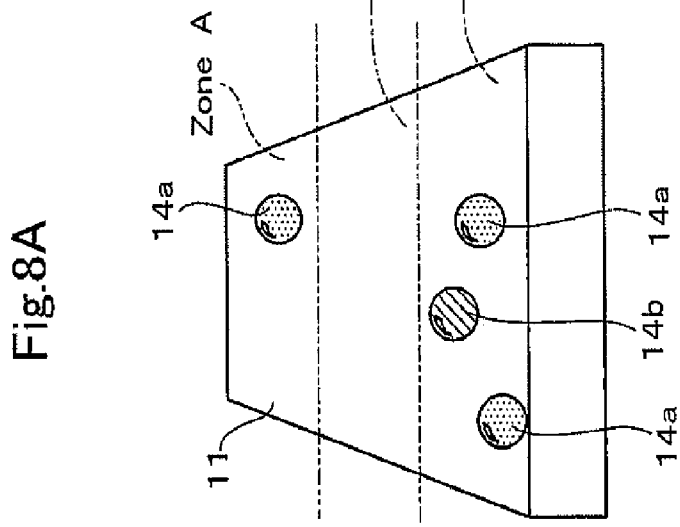
FIG. 8A is a diagram illustrating a table state of a second evaluation target.

FIG. 8B is a diagram illustrating an example of the contents of the evaluation comparison data 25e corresponding to the scoring result of FIG. 8A. As illustrated in FIG. 8B, in a similar manner to the example of FIG. 7B, for each of the table 11 as the second evaluation target and the table 11 as the reference state, information of respective scores for the number, the kind, and the position is described in the evaluation comparison data 25e.

On the other hand, in the example of FIG. 8B, when the scores in the evaluation reference data 25d and the scores concerning the table 11 as the second evaluation target are compared, the total score of the table 11 as the second evaluation target is lower. In this case, it is evaluated such that the expectation value of the table 11 as the second evaluation target is lower than that of the reference as well as than that of the table 11 as the first evaluation target. In the table 11 as the second evaluation target, more balls 14 are arranged at positions near the ditch 15 compared with the table 11 as the first evaluation target. However, no third balls 14c with a high value are present on the table 11 as the second evaluation target. Therefore, the total score does not reach the reference value. Thus, not only the position of the ball 14 but also the number and the kind influence the evaluation on the state of the table 11.

When the expectation value of the state of the table 11 as the evaluation target is lower than that in the evaluation reference data 25d, the number or the like of the balls 14 to be added next time is determined such that the state of the table 11 becomes close to the expectation value of the reference state. For example, in the example of FIG. 8B, the scores for the number and the kind do not reach the score of the reference state. Therefore, the number or the like of the balls 14 that will be added to the table 11 next time is determined such that the scores for the number and the kind are close to the scores of the reference state. That is, the addition of the balls 14 is executed so that the ball 14 with a higher value, such as the third ball 14c or the like, is included, and the number of the balls 14 on the table 11 is increased.

The balls 14 to be added next time to the table 11 as the second evaluation target will be described in detail with reference to FIGS. 9A and 9B. The determination about the number or the like of the balls 14 to be added next time will be made after the medals 13 are added. That is, the progress of the game by the addition of the medals 13 is reflected on the number or the like of the balls 14 to be added.

FIG. 9A is an explanatory diagram for describing an example of the number or the like of balls 14 to be added next time in the case of the table state of FIG. 8A. The example of FIG. 9A represents the case in which the first ball 14a just in front of the ditch 15 falls to the ditch 15 as a result of addition of the medals 13. In this case, the number of balls on the table 11 decreases to three since the first ball 14a falls to the ditch 15 as illustrated in FIG. 9A. That is, the score for the number decreases to "6" after the charging of the medal 13. In this case, the score for the number is lower than the score of the reference state by four points. On the other hand, with the falling of the first ball 14a, the score for the kind decreases to "4". That is, the score for the kind is lower by 6 points than the score of the reference state. Further, with the charging of the medal 13, the first ball 14a located in the Zone A moves to the Zone B. Therefore, with the decrease of the score attributable to the falling of the first ball 14a and the increase of the score attributable to the movement of the first ball 14a to the Zone B, the score for the position decreases to "8". That is, the score for the position is lower than the score of the reference state by two points. In this case, for example, as indicated by two arrows a, one third ball 14c and one second ball 14b are added to the Zone A.

The state of the table 11 after the balls 14 are added will be described with reference to FIG. 9B. FIG. 9B is a diagram illustrating an example of the contents of the evaluation comparison data 25e corresponding to the scoring result of the state of FIG. 9A (state after the balls 14 are added for the next time). As one third ball 14c and one second ball 14b are added to the Zone A, the score for the number, the score for the kind, the score for the position are all increased. Consequently, as illustrated in FIG. 9B, each of the scores for the number, the kind, and the position, and the total score thereof are coincident with each of the scores of the table 11 as the reference state. That is, as the balls 14 or the like are added, the expectation value of the table 11 reaches the expectation value of the reference state. In this way, when the expectation value of the table 11 is lower than the expectation value of the reference state, the number or the like of the balls 14 to be added is determined so as to compensate for a difference between the score of the evaluation target and the score of the reference state. In addition, the score after the change is not necessarily coincident with the score of the reference state. As a target score of the total score after adjustment, a score within a predetermined range from the score of the reference state may be used. That is, the target score of the total score may be within the predetermined range from the score of the reference state. Therefore, the adjustment when the score is lower than the score of the reference state may be executed when the score is lower than the score of the reference state by points equal to or greater than the predetermined range.

Figure 10:
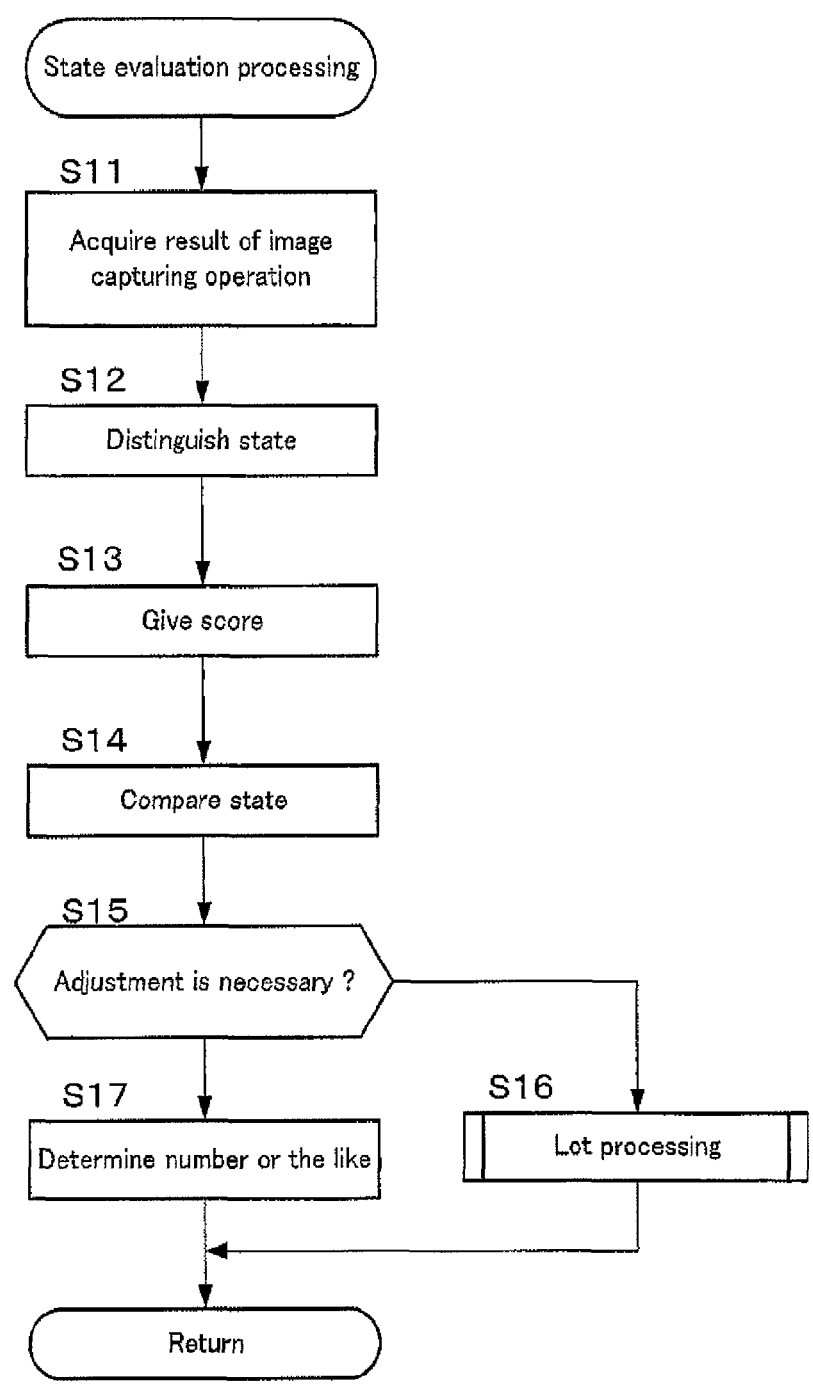
FIG. 10 is a diagram illustrating an example of a flowchart of a state evaluation processing routine.

Next, a state evaluation process executed by the center control unit 21 will be described. FIG. 10 is a diagram illustrating an example of the flowchart of a state evaluation processing routine that is executed by the center control unit 21. For example, the center control unit 21 executes the routine of FIG. 10 through the pusher game providing unit 26. The pusher game providing unit 26 executes the routine of FIG. 10 repeatedly with a predetermined period. For example, as the predetermined period, the period that the medal 13 is added to the table 11 may be adopted. That is, as an example, the routine of FIG. 10 may be executed whenever the medal 13 is added. Moreover, the addition of the medal 13 may be executed when a predetermined game condition is met for example. The center control unit 21 executes various kinds of known processing necessary to execute the pusher game, such as processing to control the pusher driving mechanism 18 or the like, besides the routine of FIG. 10. However, a description about details of such processing is omitted.

First of all, when the routine of FIG. 10 is initiated, the pusher game providing unit 26 acquires a result of an image capturing operation of the camera 16 in step S11. Subsequently in step S12, the pusher game providing unit 26 distinguishes the state of the table 11 based on the image capturing result obtained in step S11. Specifically, the pusher game providing unit distinguishes the number, the kind, and the position of the respective balls 14 placed on the table 11. For example, the distinguishing of the position is achieved by specifying the unit range r in which each of the balls 14 is arranged based on the image capturing result, and specifying the Zone to which the unit range r belongs. Moreover, the Zone to which each of the unit ranges r belongs may be specified, for example, by using data for associating each of the unit ranges r with each of the Zones. For example, this data may be stored in the memory device 22 as one piece of the evaluation data 25. On the other hand, the distinguishing of the number is achieved, for example, by specifying the number of the unit ranges r where the balls 14 are arranged. Moreover, the distinguishing of the kind is achieved by specifying the color (or the size) of each of the balls 14.

In step S13, the pusher game providing unit 26 gives a score to the state of the table 11 based on the distinguishing result from step S12 and the evaluation data 25. Giving the score is executed, for example, based on the number, the kind, and the position of the balls 14 on the table 11 as described above.

Subsequently in step S14, the pusher game providing unit 26 compares the reference state of the table 11 with the state of the table 11 as the evaluation target for the present time. This comparison is executed, for example, as follows. At first, the pusher game providing unit 26 generates the evaluation comparison data 25e based on the scores given in step S13 and the evaluation reference data 25d. This evaluation comparison data 25e is temporarily stored in the memory device 22, for example. Moreover, the pusher game providing unit 26 compares the total score given to the state of the table 11 for the present time and the total score of the reference state based on the generated evaluation comparison data 25e. The pusher game providing unit 26 achieves the comparison of the states by using this comparative result as an example.

Subsequently in step S15, the pusher game providing unit 26 determines whether or not adjustment of the state of the table 11 is necessary. Specifically, the pusher game providing unit 26 determines that the adjustment is unnecessary by using the comparative result of step S14 when the total score of the table 11 as the evaluation target is higher than the total score of the reference state (exceeds the predetermined range) or when this score is within the predetermined range. In this case, the pusher game providing unit 26 proceeds to step S16, determines the number or the like of the balls 14 to be added to the table 11 next time by lot processing, and ends this routine. In addition, this lot processing may be achieved by a known processing.

On the other hand, when the total score of the table 11 as the evaluation target is lower than the total score of the reference state (does not yet reach the predetermined range), in step S15, the pusher game providing unit 26 determines that the adjustment is necessary. In this case, the pusher game providing unit 26 proceeds to step S17.

The pusher game providing unit 26 determines the number or the like of the balls 14 to be added next time in step S17. This determination is made, for example, in the above-described manner. Specifically, based on the comparison result of step S14, a component with a low score compared to the reference state, that is, the number, the kind, or the position is specified. Moreover, the number, the kind, and the position of the balls 14 to be added next time are determined such that the specified component with a low score can reach the score of the reference state (equal to or greater than the predetermined range). This determination is sequentially executed, for example, one by one for each of the components with a low score. As an example, at first, the number of the balls 14 to be added is determined such that the score of the number, which is lower than that of the reference state, can reach the score of the reference state. Next, when the score for the kind is lower than the score of the reference state, the kind of two balls 14 to be added is determined such that the score for the kind can reach the score of the reference state by addition of the two balls 14. Further, when the score for the position is lower than the score of the reference state, the position of two balls to be added is determined such that the score for the position can reach the score of the reference state by the addition of the two balls. In this case, the total score may be considered. That is, when the total score exceeds the score of the reference state, the score for the position is determined such that the total score may approach the score of the reference state within the range where the total score reaches the score of the reference state. Moreover, for determination of each of the components such as the number, the kind, or the position, there may be used simulation that calculates the change in the score after the addition. That is, an appropriate number or the like may be determined by calculating the change in the score by the simulation. Or, a predetermined expression by which each of the components to be added can be calculated may be used for this determination.

As described above, the pusher game providing unit 26 determines the number or the like of the balls 14 to be added next time. And, when the processing of step S17 is finished, the pusher game providing unit 26 ends this routine. As a result, when the score of the state of the table 11 is lower than the score of the reference state, the balls 14 to be added next time are determined such that the score of the state of the table 11 can reach the score of the reference state. On the other hand, when the score of the state of the table 11 is higher than the score of the reference state, or the like, that is, when the adjustment is unnecessary, the balls 14 for the next time are determined by lot.

As described above, according to this embodiment, in the pusher game of the center unit 3, the state of the table 11 is evaluated with the number, the kind, and the position of the balls 14. And, when the evaluation is lower than the reference state based on the evaluation result, the number, the kind, and the position of the balls 14 can be adjusted so that the evaluation may be improved next time by the addition of the balls. Since a predetermined favor relates to each of the balls 14, the number or the like of the balls 14 can be evaluated as the expectation value of the table 11. That is, the state of the table 11 can be evaluated as the expectation value. Therefore, the expectation value for the predetermined favor can be adjusted by adjusting the state of the balls 14. As a result, a variation in the expectation value of the table 11 can be prevented, and the expectation value of the table 11 can be regulated to be even. Moreover, motivation to the game may be improved.

In the embodiment described above, the center control unit 21 functions as a state distinguishing device, a state evaluating device, and a change giving device by executing the routine of FIG. 10 through the pusher game providing unit 26. Moreover, the memory device functions as an evaluation data storage device and a reference information storage device by storing the evaluation data 25.

The present invention is not limited to the embodiment described above, and can be executed in an appropriate proper embodiment. In the above-described embodiment, when the evaluation on the state of the object within a predetermined area is lower than the evaluation on the reference state, the state of the object is changed so that the evaluation increases, that is, the evaluation is improved. However, the change in the state of the object is not limited to the embodiment. For example, when the evaluation on the state of the object is higher than the evaluation on the reference state to reach or exceed a predetermined upper limit value, the state of the object may be changed so that the evaluation on the state of the object may be reduced. In this case, the expectation value is prevented from increasing to exceed the predetermined upper limit value. Even with this processing, the expectation value can be regulated to be even.

In the embodiment described above, the number, the kind, and the position are used as the state of the object. And, the total numerical value when those are numerically expressed is first compared with the reference total numerical value of the reference state, and whereby it is determined whether or not the state of the object is changed based on the comparison result. However, the evaluation of the state of the object is not limited to the embodiment. For example, instead of using the total numerical value, only one of the number, the kind, and the position may be used for the evaluation. In such a case, for example, when only the number is used for evaluation, it is determined that the evaluation is low when the number is smaller than the reference, and thus the objects are added so that the number reaches the reference number. Or, when only the kind is used for evaluation, it is determined that the evaluation is low when the kind used as the reference is not present, and the objects are added so that the kind used as the reference is present within a predetermined area. When the position is used for the evaluation, the similar process is performed. In these cases, as the state of the object, any one of the number, the kind, and the position can be changed so as to reach the reference state. As a result, an important factor can surely be made uniform. On the other hand, as in the embodiment described above, when the total numerical value is used, the state of the object can be adjusted in consideration of many components such as the number, the kind, and the position. As a result, a well-balanced adjustment can be achieved.

In the embodiment described above, the pusher game that can adjust the state of the object is provided in the center unit 3. In other words, the pusher game is provided as a second game when a predetermined game condition is met in the station unit 2. However, the present invention is not limited to such an embodiment. For example, the present invention may be achieved with the game machine that independently provides the pusher game. Therefore, the present invention is not limited to an embodiment in which the pusher game is used as a second game.

In the embodiment described above, physical media such as the balls 14 are used as the objects. However, the pusher game provided by the game machine of the present invention is not limited to the embodiment. For example, the pusher game provided by the game machine of the present invention may be achieved as a video game (where a table 11, a pusher 12, and a ball 14, and the like are displayed in a monitor).

Moreover, in the embodiment described above, the state of the balls 14 is changed by directly adding the balls 14 according to the evaluation. However, an embodiment in which the state of the objects is changed is not limited to the embodiment like this. For example, according to the evaluation result, a medal which moves the ball 14 so that the evaluation may reach the evaluation corresponding to the reference state may be added. That is, the change of the state of the objects is not limited to the example in which the state of the objects is changed by addition of objects directly. That is, the addition of indirect things etc. may change the state of the objects.

Moreover, the game machine of the present invention may be implemented into a proper embodiment such as a business game machine installed in a commercial facility, a household installation-type game machine, a portable game machine, and a game machine realized using a network.

What is claimed is:

1. A game machine comprising:
at least one station unit including a display, wherein the at least one station unit offers a slot game to a user on the display; and
a center unit coupled to the at least one station unit, the center unit offering a pusher game when a triggering condition of the at least one station unit is met, wherein the center unit offers the pusher game when a triggering condition of the slot game is met, the center unit comprising:
an object information acquiring device that acquires object information for distinguishing a state of at least one object in the predetermined area;
a state distinguishing device that distinguishes the state of the at least one object in the predetermined area, based on the object information acquired by the object information acquiring device;
a state evaluating device that evaluates the state of the at least one object in the predetermined area based on a result of the distinguishing of the state distinguishing device; and
a change giving device configured to change the state of the at least one object in the predetermined area based on an evaluation result of the state evaluating device so that the evaluation result changes, the change giving device being further configured to add at least one additional object to the predetermined area upon a determination that the state of the at least one object satisfies a pre-defined condition.

2. The game machine according to claim 1,
wherein the object information includes information concerning a position of the at least one object in the predetermined area,
wherein the state distinguishing device distinguishes at least the position of the at least one object in the predetermined area as the state of the at least one object, based on the object information, and
wherein the state evaluating device evaluates at least the position of the at least one object in the predetermined area as the state of the at least one object.

3. The game machine according to claim 1,
wherein the at least one object includes a plurality of objects,
wherein the object information includes information concerning the number of the objects existing in the predetermined area,
wherein the state distinguishing device distinguishes at least the number of the objects existing in the predetermined area as the state of the objects based on the object information, and
wherein the state evaluating device evaluates at least the number of the objects existing in the predetermined area as the state of the objects.

4. The game machine according to claim 1,
wherein the at least one object corresponds to one of a plurality of kinds of object, each kind of the plurality of kinds being associated with a different favor value,
wherein the object information includes information concerning the kind of the at least one object existing in the predetermined area,
wherein the state distinguishing device distinguishes at least the kind of the at least one object existing in the predetermined area as the state of the at least one object based on the object information, and
wherein the state evaluating device evaluates at least the kind of the at least one object existing in the predetermined area as the state of the at least one object.

5. The game machine according to claim 1, further comprising:
an evaluation data storage device that stores evaluation data used to express the state of the at least one object as a numerical value;
a reference information storage device that stores reference information for obtaining a reference numerical value used as a comparison reference,
wherein the state evaluating device evaluates the state of the at least one object in the predetermined area by expressing the state of the at least one object as a numerical value based on the evaluation data, and by comparing the numerical value with the reference numerical value obtained based on the reference information.

6. The game machine according to claim 5,
wherein, based on the evaluation result, the change giving device changes the state of the at least one object in the predetermined area when the numerical value corresponding to the state of the at least one object is lower than the reference numerical value so that the numerical value corresponding to the state of the at least one object increases.

7. The game machine according to claim 5,
wherein the at least one object corresponds to one of a plurality of kinds of object, each kind of the plurality of kinds being associated with a different favor value,
wherein the object information includes information concerning at least two of a number, the kind, and a position of the at least one object existing in the predetermined area,
wherein the state distinguishing device distinguishes at least two of the number, the kind, and the position of the at least one object included in the object information as the state of the at least one object based on the object information, and
wherein the state evaluating device evaluates the state of the at least one object in the predetermined area by expressing at least two of the number, the kind, and the position included in the object information as numerical values based on the evaluation data, and by comparing a total numerical value of the numerical values with a reference total numerical value corresponding to a total numerical value of reference numerical values obtained based on the reference information.

8. The game machine according to claim 1, wherein the game machine awards a user with a predetermined favor when the user wins the pusher game.

9. The game machine according to claim 1, wherein the at least one object is a physical object.

10. A control method of controlling a computer which is incorporated in a game machine, the game machine comprising at least one station unit including a display, wherein the at least one station unit offers a slot game to a user on the display, a center unit coupled to the at least one station unit, the center unit offering a pusher game when a triggering condition of the slot game is met, the center unit including an object information acquiring device that acquires object information for distinguishing a state of at least one object in a predetermined area, wherein the control method of controlling the computer comprises:

a state distinguishing step that distinguishes the state of the at least one object in the predetermined area, based on the object information acquired by the object information acquiring device;

a state evaluating step that evaluates the state of the at least one object in the predetermined area based on a distinguishing result of the state distinguishing step; and a change giving step that changes the state of the at least one object in the predetermined area based on an evaluation result of the state evaluating step so that the evaluation result is changed, the change giving step including the step of adding at least one additional object to the predetermined area upon a determination that the state of the at least one object satisfies a predefined condition.

11. A computer program for a game machine and embodied on a non-transitory storage medium, the game machine comprising at least one station unit including a display, a center unit coupled to the at least one station unit, wherein the at least one station unit offers a slot game to a user on the display, the center unit offering a pusher game when a triggering condition of the slot game is met, the center unit including an object information acquiring device that acquires object information for distinguishing a state of at least one object in a predetermined area, wherein the computer program is configured to program a computer incorporated in the game machine to operate as:

a state distinguishing device that distinguishes the state of the at least one object in the predetermined area, based on the object information acquired by the object information acquiring device;

a state evaluating device that evaluates the state of the object in the predetermined area based on a result of the distinguishing of the state distinguishing device; and a change giving device configured to change the state of the at least one object in the predetermined area based on an evaluation result of the state evaluating device, the change giving device being further configured to add at least one additional object to the predetermined area upon a determination that the state of the at least one object satisfies a predefined condition.

12. The game machine according to claim 2,
wherein the at least one object includes a plurality of objects,
wherein the object information includes information concerning the number of the objects existing in the predetermined area,
wherein the state distinguishing device distinguishes at least the number of the objects existing in the predetermined area as the state of the objects based on the object information, and
wherein the state evaluating device evaluates at least the number of the objects existing in the predetermined area as the state of the objects.

13. The game machine according to claim 12,
wherein each of the objects corresponds to one of a plurality of kinds of object, each kind of the plurality of kinds being associated with a different favor value, wherein the object information includes information concerning the kinds of the objects existing in the predetermined area,
wherein the state distinguishing device distinguishes at least the kinds of the objects existing in the predetermined area as the state of the objects based on the object information, and
wherein the state evaluating device evaluates at least the kinds of objects existing in the predetermined area as the state of the objects.

14. The game machine according to claim 13, further comprising:
an evaluation data storage device that stores evaluation data used to express the state of the objects as a numerical value;
a reference information storage device that stores reference information for obtaining a reference numerical value used as a comparison reference,
wherein the state evaluating device evaluates the state of the objects in the predetermined area by expressing the state of the objects as a numerical value based on the evaluation data, and by comparing the numerical value with the reference numerical value obtained based on the reference information.

15. The game machine according to claim 14,
wherein, based on the evaluation result, the change giving device changes the state of the objects in the predetermined area when the numerical value corresponding to the state of the objects is lower than the reference numerical value so that the numerical value corresponding to the state of the objects increases.

16. The game machine according to claim 15,
wherein the object information includes information concerning at least two of a number, the kind, and a position of the objects existing in the predetermined area,
wherein the state distinguishing device distinguishes at least two of the number, the kind, and the position of the objects included in the object information as the state of the objects based on the object information, and
wherein the state evaluating device evaluates the state of the objects in the predetermined area by expressing at least two of the number, the kind, and the position included in the object information as numerical values based on the evaluation data, and by comparing a total numerical value of the numerical values with a reference total numerical value corresponding to a total numerical value of reference numerical values obtained based on the reference information.

17. The game machine according to claim 16, wherein the game machine awards a user with a predetermined favor when the user wins the pusher game.

18. The game machine according to claim 17, wherein each of the objects is a physical object.

* * * * *